(12) United States Patent
Lange et al.

(10) Patent No.: US 8,944,726 B2
(45) Date of Patent: Feb. 3, 2015

(54) COUNTERSINKING TOOL

(75) Inventors: Jens Mario Lange, Albstadt (DE);
Günther Hartmann, Albstadt (DE);
Ingo von Puttkamer, Messstetten (DE)

(73) Assignee: Guehring OHG, Albstadt (DE)

(*) Notice: Subject to any disclaimer, the term of this patent is extended or adjusted under 35 U.S.C. 154(b) by 0 days.

(21) Appl. No.: 13/461,205

(22) Filed: May 1, 2012

(65) Prior Publication Data

US 2013/0004254 A1 Jan. 3, 2013

Related U.S. Application Data

(63) Continuation of application No. PCT/EP2010/006667, filed on Nov. 2, 2010.

(30) Foreign Application Priority Data

Nov. 8, 2009 (DE) .......................... 10 2009 052 104
Dec. 4, 2009 (DE) .......................... 10 2009 056 818
Apr. 4, 2010 (DE) .......................... 10 2010 014 022

(51) Int. Cl.
*B23B 49/00* (2006.01)
*B23B 51/10* (2006.01)

(52) U.S. Cl.
CPC ............. *B23B 49/005* (2013.01); *B23B 51/102* (2013.01)
USPC .......................................... 408/1 R; 408/202

(58) Field of Classification Search
CPC .... B23B 51/102; B23B 51/104; B23B 51/10; B23B 49/005; B23B 49/003; B23B 2260/0482
USPC .......................... 408/1 R, 93, 94, 202; 279/82
See application file for complete search history.

(56) References Cited

U.S. PATENT DOCUMENTS

| 2,945,403 | A | * | 7/1960 | Egger | 408/202 |
| 3,320,832 | A | * | 5/1967 | Jensen | 408/112 |
| 3,545,311 | A | * | 12/1970 | Messer, Jr. | 82/1.5 |
| 3,806,271 | A | | 4/1974 | Abe et al. | |
| 4,818,157 | A | * | 4/1989 | Kouvelis | 408/240 |
| 6,431,801 | B2 | * | 8/2002 | Vasudeva et al. | 408/211 |
| 7,070,364 | B2 | * | 7/2006 | Weare | 408/1 R |
| 7,635,242 | B2 | * | 12/2009 | Jeon et al. | 409/138 |
| 2006/0008332 | A1 | * | 1/2006 | Greenberg et al. | 408/202 |
| 2006/0257220 | A1 | * | 11/2006 | Gertner | 408/202 |

FOREIGN PATENT DOCUMENTS

| DE | 552 110 | 6/1932 |
| DE | 931 024 | 7/1955 |
| DE | 101 54 434 | 6/2003 |

(Continued)

*Primary Examiner* — Andrea Wellington
*Assistant Examiner* — Alan Snyder
(74) *Attorney, Agent, or Firm* — Burr & Brown, PLLC

(57) ABSTRACT

The invention relates to a stop for arrangement on a drilling, milling or countersinking tool for machining a work piece, wherein the work piece has a surface, and wherein the drilling, milling or countersinking tool has a cutting section. The stop comprises a contact surface, wherein the contact surface is arranged such that once a predetermined machining depth in the work piece is reached, the contact surface is seated against the surface, at least in some sections. A connecting element is provided, wherein the connecting element is arranged between the contact surface and the cutting section. The connecting element is suited to prevent a relative movement between the contact surface and the surface.

9 Claims, 6 Drawing Sheets

(56) References Cited

FOREIGN PATENT DOCUMENTS

| DE | 10154434 | A1 | * | 6/2003 |
| JP | 52062579 | | | 5/1977 |
| JP | 62007316 | | | 1/1987 |
| JP | 02171216 | A | * | 7/1990 |

* cited by examiner

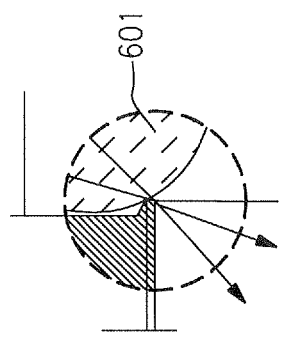
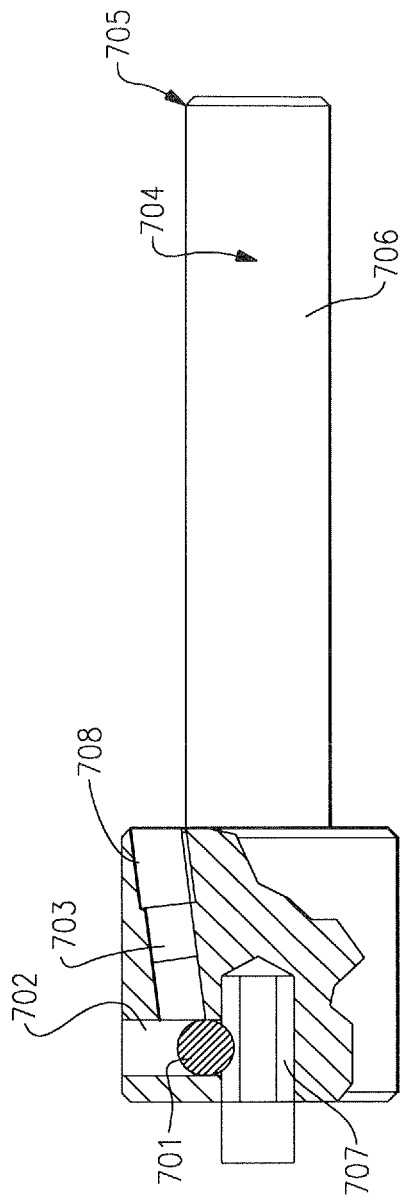

COUNTERSINKING TOOL

FIELD OF THE INVENTION

The present invention pertains to a stop for being arranged on a drilling, milling or countersinking tool for machining a workpiece, a countersinking tool, a countersinking device for countersinking and/or deburring and a method for countersinking a workpiece.

BACKGROUND OF THE INVENTION

Stops for limiting the penetration depth of a tool into a workpiece during the machining of the workpiece with cutting tools are known from the prior art.

SUMMARY OF THE INVENTION

During the machining of workpieces, an excessively deep machining depth can be prevented with the aid of stops. In this case, the stops are arranged on the machining tool. The stops typically move together with the tool such that the surface of the workpiece may be scratched when the stop contacts the workpiece. Scratching may occur, in particular, during the machining of workpieces that consist of soft materials such as, e.g., aluminum.

The objective of the present invention therefore can be seen in making available a stop that largely prevents the stop from scratching and/or scraping on the surface.

This objective is attained with the independent claims. Other advantageous embodiments of the invention result from the dependent claims.

According to a first embodiment of the invention, a stop for being arranged on a drilling, milling or countersinking tool for machining a workpiece is proposed, wherein the workpiece has a surface, wherein the drilling, milling or countersinking tool features a cutting section, and wherein the stop comprises: a contact surface, wherein the contact surface is arranged such that the contact surface at least sectionally comes in contact with the surface once a predetermined machining depth in the workpiece is reached, and a connecting element, wherein the connecting element is arranged between the contact surface and the cutting section, and wherein the connecting element is suitable for preventing a relative movement between the contact surface and the surface.

According to the invention, the transmission of a torque from the driven cutting section of the tool to the stop is prevented such that a possibly occurring relative movement between the stop and the workpiece can be quickly stopped when the stop contacts the surface of the workpiece due to the friction between the stop and the workpiece. This makes it possible to largely prevent scraping or scratching on the surface of the workpiece such that the workpiece surface is treated with care.

According to a second embodiment of the invention, a countersinking tool is proposed, wherein the countersinking tool comprises: a cutting section for countersinking and/or deburring an opening of a bore and a stop according to one of Claims 1 to 3.

The stop on the countersinking tool is realized adjustably such that bevels of different width or diameter can be produced with the countersinking tool.

A countersinking tool serves for deburring and/or for cutting a bevel on the opening of a bore. In this case, bevels with approximately identical diameters preferably should be produced. A stop can be used for this purpose. According to the invention, the countersinking tool is provided with a stop, wherein the transmission of the torque acting upon the working cutting section of the countersinking tool to the stop is prevented. The arrangement of the stop on the countersinking tool can be realized, e.g., by means of a roller bearing.

According to a third embodiment of the invention, a countersinking device for countersinking and/or deburring an opening of a through-bore is proposed, wherein the countersinking device comprises: a countersinking tool according to one of Claims 5 to 8 for countersinking and/or deburring the opening, wherein the countersinking tool features a first coupling section and a coupling element, wherein the coupling element features a second coupling section, and wherein the first coupling section can be separably connected to the second coupling section.

According to a fourth embodiment of the invention, a method for countersinking a workpiece is proposed, wherein the method comprises the steps of: countersinking by means of a countersinking device according to one of Claims 9 to 10, wherein the countersinking tool is separably connected to the coupling element, wherein a withdrawal force is required for the separation, and wherein the countersinking tool is pressed against the workpiece with a force that is lower than the withdrawal force during the countersinking process, and retooling, wherein the countersinking tool is pressed against the workpiece with a force that is higher than the withdrawal force.

Exemplary embodiments are described in the dependent claims.

According to an exemplary embodiment of the invention, a stop is proposed, wherein the connecting element is realized in such a way that the stop is arranged rotatably referred to the drilling, milling or countersinking tool and/or wherein the connecting element is realized in the form of a roller bearing.

Due to the freely rotatable arrangement of the stop, e.g., on the countersinking tool, it is possible to prevent the torque that causes the cutting edges of the tool to rotate from being transmitted to the stop.

In one embodiment, the connecting element may consist, e.g., of a roller bearing, wherein the roller bearing may be realized in the form of a ball bearing, a cylindrical roller bearing, a needle bearing, a tapered roller bearing, a spherical roller bearing or a toroidal roller bearing.

According to an exemplary embodiment of the invention, a stop is proposed, wherein the stop is realized in the form of a sleeve, in which case the contact surface is realized in the form of a circular ring, or wherein the stop is realized in a rod-shaped fashion, in which case the contact surface is realized in the form of a circular disk.

A stop in the form of a sleeve makes it possible to ensure that the machining depth in the workpiece is never deeper than intended, namely also at oblique tool angles.

Alternatively, the stop may essentially be realized in the form of a rod or several rods such that a simple manufacture of the stop can be achieved.

According to another exemplary embodiment of the invention, a countersinking tool is proposed, wherein the countersinking tool comprises: a coupling section for being separably connected to a coupling element in order to transmit a torque to the countersinking tool.

According to an exemplary embodiment of the invention, a countersinking tool is proposed, wherein the coupling section is arranged on the opposite region of the countersinking tool referred to the cutting section.

According to another inventive embodiment, a countersinking tool is proposed, wherein the coupling section is sectionally realized in the form of a hexagon or a hexagon socket.

A coupling section that is realized, e.g., in the form of a hexagon or a hexagon socket can serve for transmitting a torque.

According to another exemplary embodiment of the present invention, a countersinking tool is proposed, wherein the coupling section features a constriction or a groove.

A constriction or groove on the coupling section may serve, e.g., for securing the interconnected parts of a countersinking device that may comprise a countersinking tool and a coupling element.

According to an exemplary embodiment of the invention, a countersinking device is proposed, wherein the first coupling section is at least sectionally realized in the form of a hexagon, and wherein the second coupling section is at least sectionally realized in the form of a hexagon socket.

A concept of the invention can be seen in proposing a machining tool with a stop that is realized in such a way that the torque exerted upon the cutting section of the tool cannot be transmitted to the stop. This mechanical decoupling may be realized, e.g., with a roller bearing.

The individual characteristics naturally may also be combined with one another and such combinations occasionally may result in advantageous effects that transcend the sum of the individual effects.

BRIEF DESCRIPTION OF THE DRAWINGS

Other details and advantages of the invention are elucidated below with reference to the exemplary embodiments illustrated in the drawings. In these drawings, FIG. 6 shows a ball, FIG. 7 shows a coupling element.

DETAILED DESCRIPTION OF EXEMPLARY EMBODIMENTS

Figure 1:
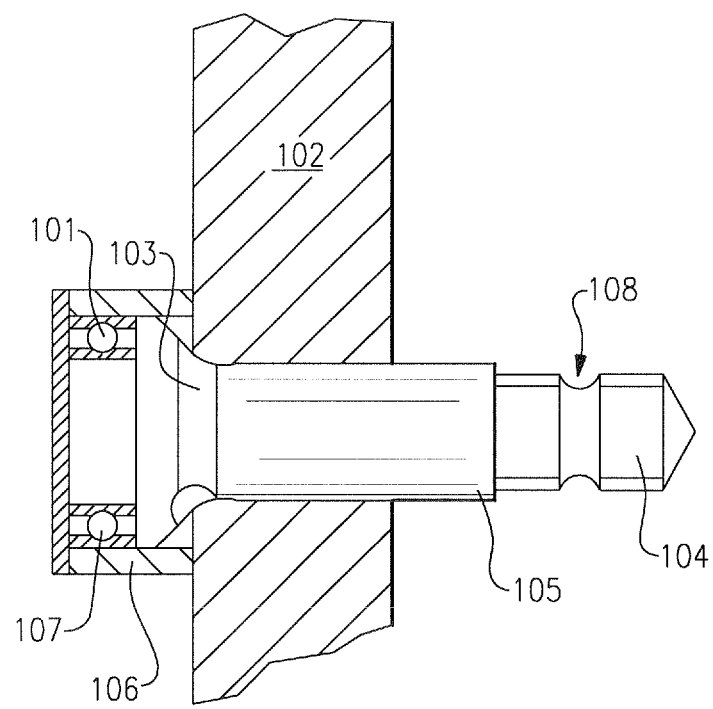
FIG. 1 shows a countersinking tool.

FIG. 1 shows a countersinking tool 105 for countersinking and/or deburring that features a cutting section 103 and a stop 106 that may be realized in the form of a sleeve. Alternatively, the stop may also be realized in the form of a rod or several rods. The stop 106 forms part of the countersinking tool 105 and therefore possibly moves together with the driven cutting section 103. According to the invention, the stop 106 comes to a standstill once the intended machining depth is reached and the stop 106 comes in contact with the surface of the workpiece 102, namely because at least one roller bearing 101, 107 is arranged between the driven cutting section 103 and the stop 106 and prevents a torque from being transmitted from the driven cutting section 103 to the stop 106. In this way, the stop 106 is prevented from continuing its rotation and from scratching the surface of the workpiece 102 when it comes in contact with the surface of the workpiece 102. The workpiece 102 may respectively consist, e.g., of aluminum, CFRP or titanium or contain aluminum, CFRP or titanium. The countersinking tool 105 comprises a coupling section 104 that may be realized, e.g., in the form of a pin. This coupling section 104 makes it possible to drive the countersinking tool 105. The coupling section 104 may be realized, e.g., in the form of a hexagon such that a torque can be transmitted. The coupling section 104 may alternatively also be realized in the form of a recess such as, e.g., a hexagon socket.

Figure 2:
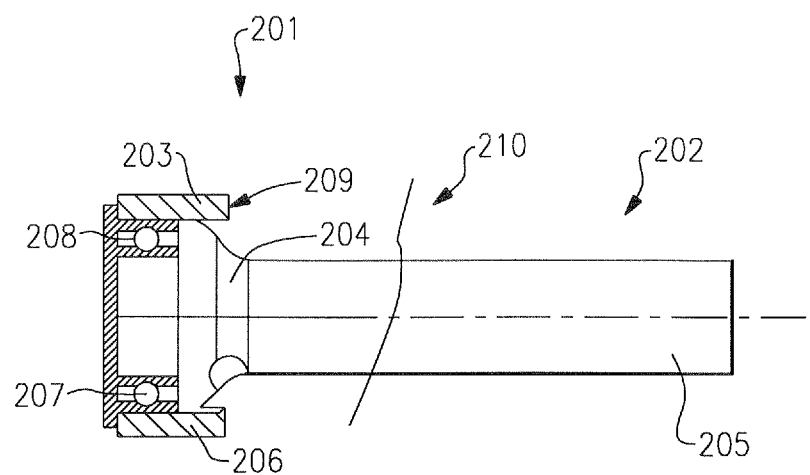
FIG. 2 shows another countersinking tool, partially in the form of a longitudinal section and partially in the form of a side view.

FIG. 2 shows a countersinking tool 205, a first section 201 of which is illustrated in the form of a longitudinal section and a second section 202 of which is illustrated in the form of a side view. The countersinking tool 205 features a stop 203, 206 that is decoupled from the driven cutting section 204 by means of at least one roller bearing 207, 208. Once the contact surface 209 of the stop 203, 206 comes in contact with the workpiece to be countersunk and/or deburred, the stop 203, 206 comes to a standstill such that scraping or scratching, e.g., on a soft aluminum surface of the workpiece can be prevented. The stop 203, 206 may also consist of a rod 203, two rods 203, 206 or more than two rods rather than a round circular sleeve, wherein the stop 203, 206 is always decoupled from the driven cutting section 204 of the countersinking tool 205 by means of at least one roller bearing 207, 208 regardless of its realization in the form of a sleeve or one or more rods or in the form of another embodiment. This ensures that the stop 203, 206 comes to a standstill when it comes in contact with the surface of the workpiece such that scraping or scratching can be largely prevented on the surface of the workpiece.

Figure 3:
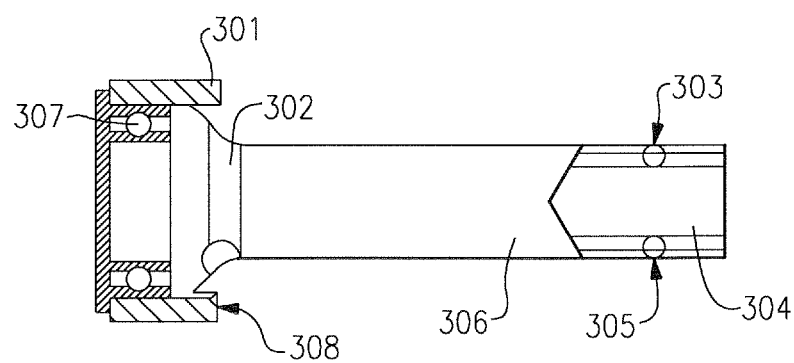
FIG. 3 shows another countersinking tool in the form of a longitudinal section.

FIG. 3 shows a countersinking tool 306 with a stop 301 and a cutting section 302 in the form of a longitudinal section, wherein the stop 301 is connected to the cutting section 302 by means of at least one roller bearing 307. Consequently, the stop 301 comes to a standstill once the contact surface 308 of the countersinking tool 306 comes in contact with the workpiece surface. The countersinking tool 306 features a recess 304 that may be realized, e.g., in the form of a hexagon socket. A complementary pin that may feature, e.g., a constriction can be inserted into this recess. For example, balls 303, 305 may be pressed into this constriction, e.g., by means of a spring force in order to couple the countersinking tool 306 to a driving machine. In an alternative embodiment, the countersinking tool 306 may be realized with only one ball 303 or three, four or any number of balls.

Figure 4:
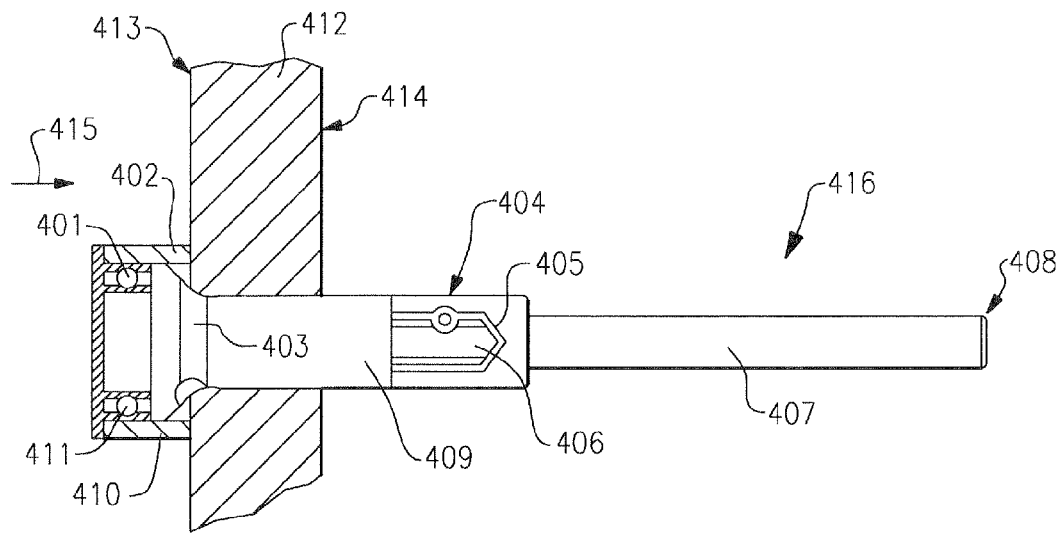
FIG. 4 shows a countersinking tool.

FIG. 4 shows a countersinking device with a countersinking tool 409 and a coupling element 416, wherein the countersinking tool 409 features a cutting section 403 and a stop 402, 410. When the stop 402, 410 comes in contact with the surface 413 of the workpiece 412, the stop 402, 410 prevents the countersinking tool 409 from cutting further into the workpiece 412. Due to the friction between the stop 402, 410 and the workpiece 412 and due to the roller bearing 401, 411 between the driven cutting section 403 and the stop 402, 410, the stop 402, 410 comes to a standstill such that damages to the surface 413 of the workpiece 412 are prevented. The countersinking tool 409 can be separably connected to a coupling element 416, wherein the countersinking tool 409 may feature a coupling section that may be realized in the form of a pin 406. This pin 406 of the countersinking tool 409 can be inserted into a recess 405 of the coupling element 416. In this case, a ball 404 of the coupling element 416 can be pressed into the constriction of the pin 406 in order to secure the coupling. The coupling element 416 features a shaft 407 that can be clamped into a driving machine such as, e.g., a hand drill. The shaft 407 features a bevel 408 in order to simplify the insertion of the shaft into the drill chuck.

Figure 5:
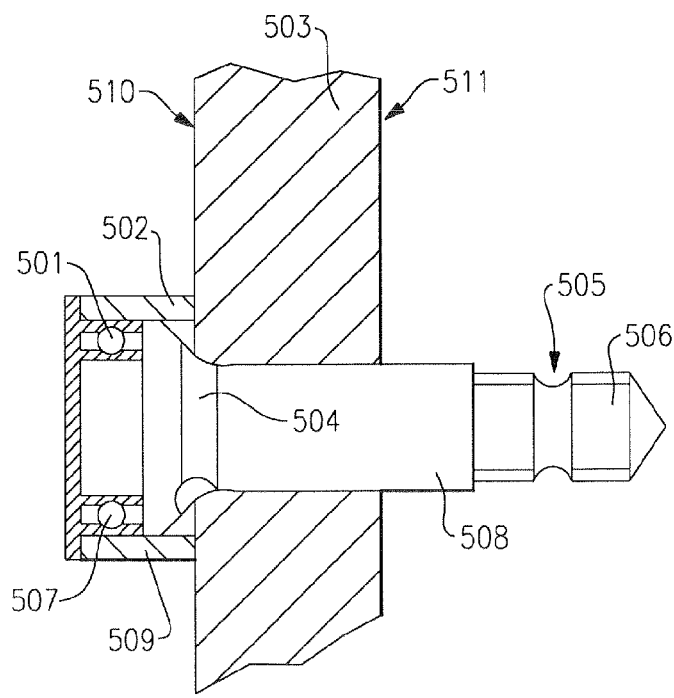
FIG. 5 shows another countersinking tool.

FIG. 5 shows a countersinking tool 508 with a cutting section 504 and a stop 502, 509, wherein the stop 502, 509 is connected to the cutting section 504 of the countersinking tool 508 via at least one roller bearing 501, 507. The countersinking tool 508 can cut a bevel on the first surface 510 of the workpiece 503 by means of the cutting section 504. The countersinking tool 508 features a pin 506 that may be realized in the form of a hexagon. The pin 506 serves for transmitting a torque to the countersinking tool 508.

FIG. 6 shows a ball 601 that can be pressed into a constriction of the pin in order to secure the pin in a receptacle.

FIG. 7 shows a coupling element that features a receptacle 707, wherein the receptacle 707 may be realized in the form of a hexagon socket in order to transmit a torque. A ball 701 that can be introduced into the coupling element through a channel 702 may be used for securing an inserted pin. The coupling element features another channel 703, into which a bolt can be introduced that acts upon the ball such that the ball 701 is prevented from disengaging from the coupling element through the channel 702. A spring may be arranged within the channel 703 behind the bolt in order to press the bolt toward the lower left. On its outer end, the channel 703 features an internal thread 708 such that a stud can be screwed into the channel 703. The stud can be screwed into the channel 703 to different depths such that the pressure exerted upon the bolt by the spring can be varied. All in all, this makes it possible to vary the pressure exerted upon an inserted pin by the ball 701. In its lower region, the channel 702 advantageously has a diameter that is smaller than the ball such that the ball 701 is prevented from falling out when the pin is removed.

Figure 8:
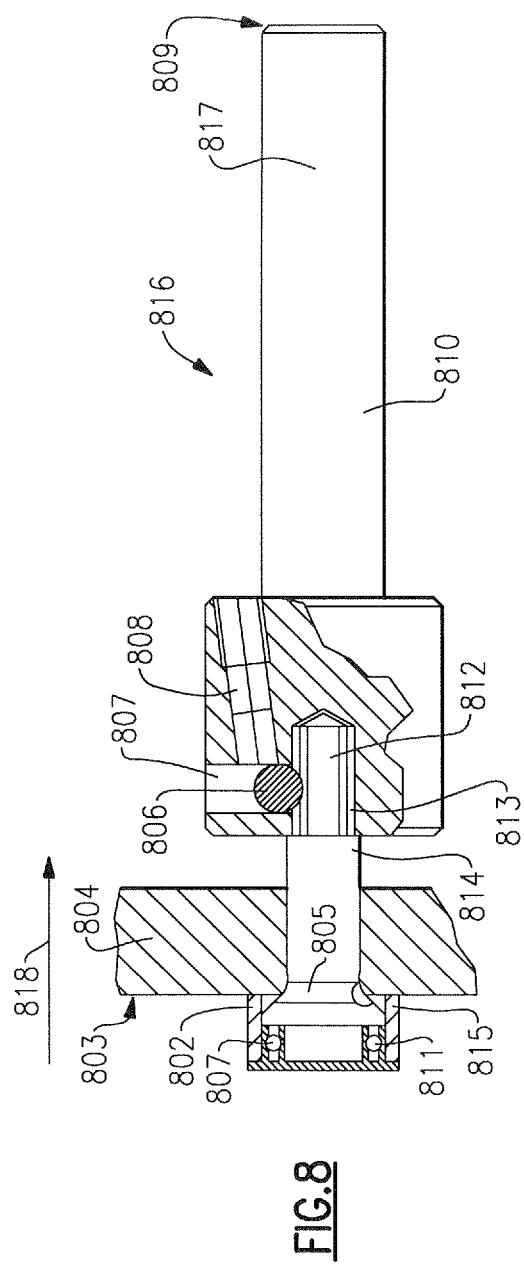
FIG. 8 shows a countersinking device.

FIG. 8 shows a countersinking device with a countersinking tool 814 that features a stop 802, 815, wherein the stop is connected to a cutting section 805 by means of a roller bearing 807, 811. The countersinking tool 814 is separably connected to a coupling element 816. The connection is produced with the aid of a pin 812 that can be inserted into a recess 813, wherein the pin 812 may be realized in the form of a hexagon and the recess 813 may be realized in the form of a hexagon socket in order to transmit a torque from the coupling element 816 to the countersinking tool 814. The coupling element 816 features a channel 807 for inserting a ball 806 into the coupling element 816, as well as a channel 808 that can accommodate a bolt/spring/stud arrangement for exerting pressure upon the ball 806. The coupling element 816 features a shaft 810 in order to clamp the coupling element 816 into the drill chuck, e.g., of a hand drill.

Figure 9:
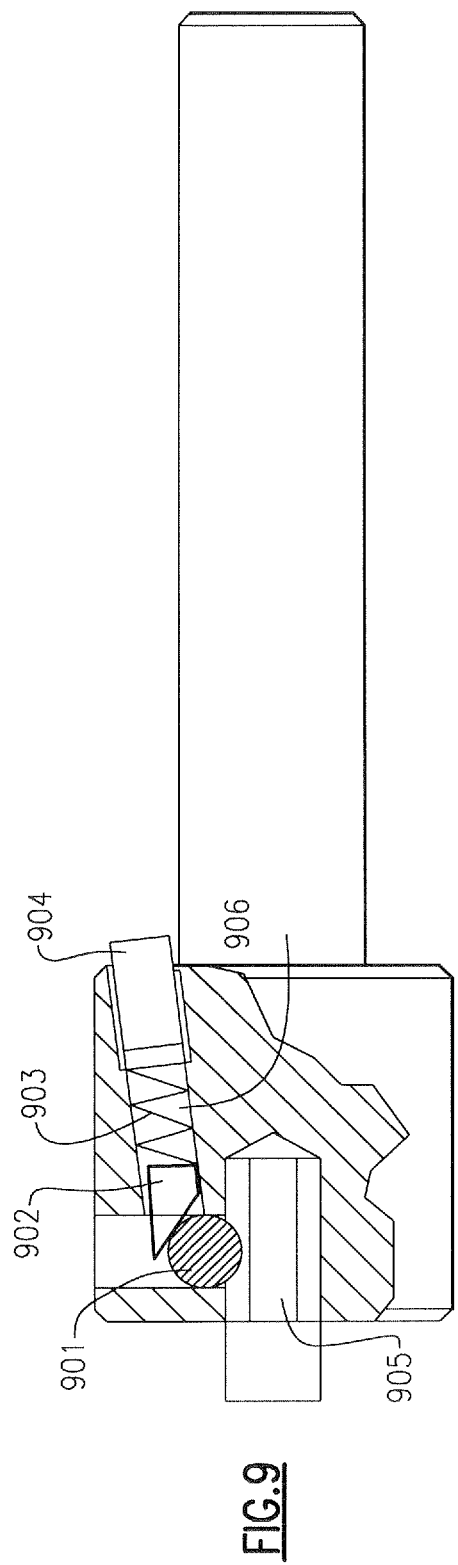
FIG. 9 shows a coupling element.

FIG. 9 shows a coupling element with a ball 901 that is designed for engaging into the constriction of an inserted pin. The ball 901 is pressed in the direction of the recess by a bolt 902, wherein the bolt 902 may be realized in a wedge-shaped fashion. The bolt 902 is pressed against the ball 901 by a spring 903, wherein the spring force can be varied with the aid of a stud 904 that can be screwed into the channel to different depths. All in all, this makes it possible to vary the pressure exerted upon the ball 901 by the bolt 902. When the stud 904 is screwed deeper into the channel 906, the pressure exerted upon the ball 901 by the bolt 902 increases. The bolt 902 is pressed against the ball 901 with a decreasing force as the stud 904 is unscrewed. A variation of the force exerted upon the ball 901 makes it possible to vary the force required for respectively inserting and withdrawing a pin into/from the recess 905, wherein this force is also referred to as withdrawal force.

FIG. 8 shows a countersinking tool 814 that is separably connected to a coupling element 816, wherein the countersinking tool 814 cuts a bevel into the workpiece 804 when the countersinking device is displaced in the direction of the arrow 818. During this process, it needs to be ensured that the countersinking tool 814 is pressed against the surface 803 in order to cut the bevel with a force that is lower than the withdrawal force so as to prevent the countersinking tool 814 from being withdrawn, i.e., separated, from the coupling element 816 during the countersinking process. After the countersinking process is completed, the countersinking tool 814 can be pressed against the surface 803 of the workpiece 804 in the direction of the arrow 818 with an increasing force, namely until this force exceeds the withdrawal force in order to thusly separate the countersinking tool 814 from the coupling element 816 and initiate a retooling process. Consequently, the force that presses the ball 806 against the pin 812 needs to be adjusted such that the countersinking process can be carried out without separation of the countersinking tool 814. On the other hand, this force should not be adjusted excessively high in order to allow the withdrawal of the countersinking tool 814 by pressing it against the workpiece 804 and thusly initiate a retooling process.

Figure 10:
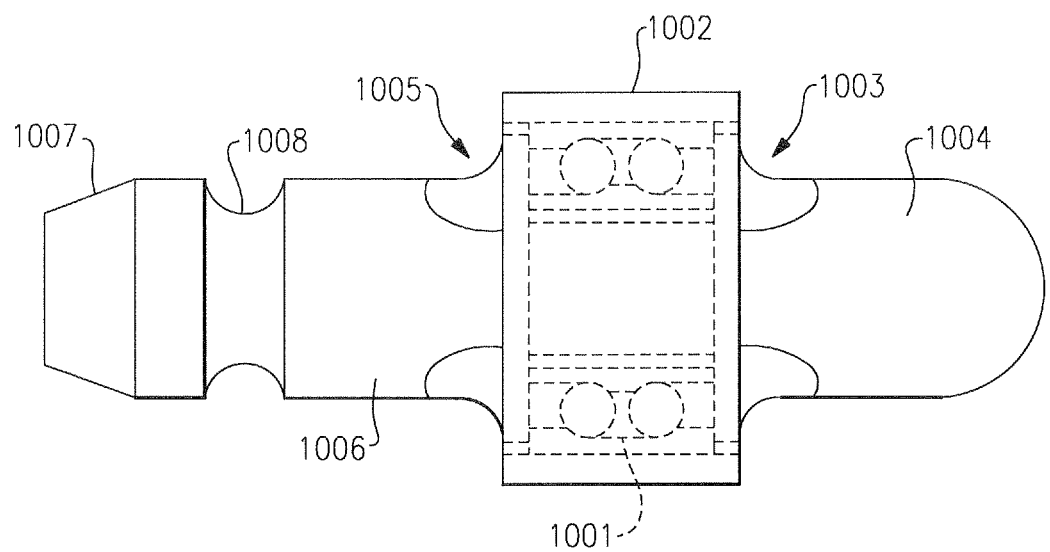
FIG. 10 shows another countersinking tool.

FIG. 10 shows a countersinking tool with a pin 1006 that it may be realized in the form of a hexagon, wherein the hexagon may feature a recess or constriction 1008 in order to be coupled to another (not-shown) tool element (quick-change adapter). In this case, the drive of the countersinking tool may be realized with the other tool element. Furthermore, a roller bearing 1001 is arranged on the countersinking tool and may be realized in the form of a double-row angular ball bearing, wherein the angular ball bearing may be tensioned and therefore realized without play. The inner race furthermore can accommodate the pins of both countersinks (e.g., bonding with Loctite). The countersinking tool may comprise a sleeve 1002, wherein the sleeve 1002 may be connected to the remaining countersinking tool by means of the roller bearing 1001 such that the transmission of a torque, e.g., from the pin 1006 to the sleeve 1002 can be prevented. The sleeve 1002 may serve as a depth stop and does not continue to rotate when it comes in contact with a surface of a workpiece to be machined due to the roller bearing 1001 such that the surface of the workpiece can be treated with care. For example, the sleeve 1002 may be bonded to the roller bearing 1001. The countersinking tool features a tapered section 1007 such that the insertion of the countersinking tool into the other tool element can be simplified. The countersinking tool can be used as backward countersink and/or forward countersink, wherein a first cutting section 1005 can be used for countersinking in a backward countersinking process and a second cutting section 1003 can be used for countersinking in a forward countersinking process. In an alternative embodiment, the countersinking tool may feature a rounded pin 1004 such that the insertion into a bore of a workpiece to be countersunk can be simplified and the surface of the workpiece can be treated with care during the insertion.

Figure 11:
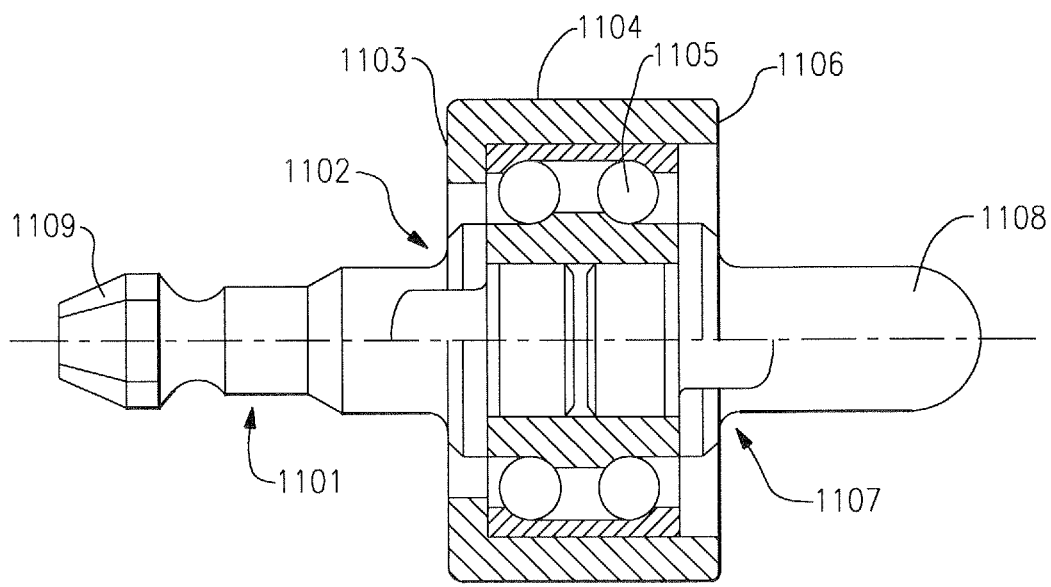
FIG. 11 shows another countersinking tool.

FIG. 11 shows a countersinking tool with a pin 1101 for being coupled to a (not shown) driving tool element, wherein the pin 1101 may feature a tapered section 1109 in order to simplify the insertion into the driving tool element. The countersinking tool features a first cutting section 1102 that is suitable for backward countersinking. The countersinking tool furthermore features a second cutting section 1107 that may be suitable for forward countersinking. The countersinking tool is provided with a sleeve 1104 that may be realized in the form of an aluminum housing and connected to the remaining countersinking tool by means of a roller bearing 1105. The roller bearing 1105 may be realized in the form of an angular ball bearing. The sleeve 1104 may feature two stops 1103, 1106, wherein the stop 1103 is provided for backward countersinking and the stop 1106 is provided for forward countersinking. In order to carry out the countersinking process, a cutting section 1102 can be used for backward countersinking and another cutting section 1107 can be used for backward countersinking. The sleeve 1104 can be adapted, e.g., after its installation on the countersinking tool in such a way that the cutting sections 1102, 1107 can cut into a bore of a workpiece to be countersunk to the desired depth. A pin 1108 may be used for inserting the forward countersink. In an alternative embodiment, the pin 1108 may be rounded in order to prevent a surface of a workpiece to be processed from being scratched or damaged during the insertion of the forward countersink.

It should be noted that "comprising" does not exclude other elements or steps, and that "a" or "an" does not exclude several elements and steps.

The reference symbols used merely serve for the better understanding of the invention and should by no means be interpreted in a restrictive sense, wherein the scope of protection of the invention is reflected by the claims.

The invention claimed is:

1. A stop for being arranged on a drilling, milling, or countersinking tool for machining a workpiece, wherein the workpiece has a workpiece surface, and wherein the drilling, milling, or countersinking tool comprises a cutting section, the stop comprising a contact surface and a connecting element,
   the stop configured such that when it is arranged on a drilling, milling, or countersinking tool and positioned for machining a workpiece:
   (1) the contact surface contacts the workpiece surface once a predetermined machining depth in the workpiece is reached;
   (2) the connecting element: (a) is in direct sliding contact with the cutting section, (b) positions the stop relative to the cutting section, and (c) reduces or prevents transmission of torque from the cutting section to the stop, so that friction between the contact surface and the workpiece surface can prevent relative movement between the contact surface and the workpiece surface; and
   (3) at least part of the contact surface is radially outside the connecting element relative to a center axis of the tool.

2. The stop according to claim 1, wherein the stop is rotatable relative to the drilling, milling or countersinking tool and/or wherein the connecting element comprises a roller bearing.

3. The stop according to claim 1, wherein (1) the stop comprises a sleeve and the contact surface comprises a circular ring, or wherein (2) the stop comprises a rod shape and the contact surface comprises a circular disk.

4. A countersinking arrangement for machining a workpiece, the countersinking arrangement comprising:
   a countersinking tool that comprises a cutting section for countersinking and/or deburring an opening of a bore in the workpiece;
   a stop that comprises a contact surface and a connecting element, the stop arranged on the countersinking tool; and
   a coupling section for separately connecting to a coupling element in order to transmit torque to the countersinking tool,
   the stop configured such that when the countersinking arrangement is positioned for machining a workpiece:
      the contact surface contacts a surface of the workpiece once a predetermined machining depth in the workpiece is reached; and
      the connecting element (a) is in direct sliding contact with the cutting section, (b) positions the stop relative to the cutting section and (c) reduces or prevents transmission of torque from the cutting section to the stop, so that friction between the contact surface and the surface of the workpiece can prevent relative movement between the contact surface and the surface of the workpiece;
   the coupling section on a side of the contact surface to which the contact surface faces.

5. The countersinking arrangement according to claim 4, wherein the coupling section is arranged on an opposite region of the countersinking tool arrangement relative to the cutting section.

6. The countersinking arrangement according to claim 4, wherein the coupling section comprises a hexagon or a hexagon socket and/or wherein the coupling section comprises a constriction or a groove.

7. A countersinking device for countersinking and/or deburring an opening of a through-bore in a workpiece, wherein the countersinking device comprises:
   a countersinking arrangement; and
   a coupling element,
   the countersinking arrangement comprising a cutting section, a stop, and a first coupling section,
   the stop comprising a contact surface and a connecting element,
   the countersinking device configured such that when it is positioned for machining a workpiece:
      the contact surface contacts a surface of the workpiece once a predetermined machining depth in the workpiece is reached,
      the connecting element (a) is in direct sliding contact with the cutting section,
   (b) positions the stop relative to the cutting section and (c) reduces or prevents transmission of torque from the cutting section to the stop, so that friction between the contact surface and the workpiece surface can prevent relative movement between the contact surface and the surface of the workpiece,
   the coupling element comprising a second coupling section, the first coupling section configured to be separably connected to the second coupling section,
   the first coupling section comprising a constriction or a groove,
   the second coupling section comprising a channel with a ball,
   the constriction or groove configured to receive the ball to lock the coupling element to the first coupling section.

8. The countersinking device according to claim 7, wherein at least a portion of the first coupling section comprises a hexagonal cross-section, and the second coupling section comprises a hexagon socket.

9. A method for countersinking a workpiece, comprising:
   countersinking with a countersinking device according to claim 7, wherein the countersinking tool is separably connected to the coupling element, wherein a withdrawal force is required for the separation, and wherein the countersinking tool is pressed against the workpiece with a force that is lower than the withdrawal force during the countersinking process; and
   retooling, wherein the countersinking tool is pressed against the workpiece with a force that is higher than the withdrawal force.

* * * * *